(12) United States Patent
Kim

(10) Patent No.: US 11,552,516 B2
(45) Date of Patent: Jan. 10, 2023

(54) ROTOR OF AXIAL FLUX MOTOR

(71) Applicants: HYUNDAI MOTOR COMPANY, Seoul (KR); KIA MOTORS CORPORATION, Seoul (KR)

(72) Inventor: Shin Gyu Kim, Hwaseong-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 92 days.

(21) Appl. No.: 16/951,882

(22) Filed: Nov. 18, 2020

(65) Prior Publication Data

US 2022/0077736 A1 Mar. 10, 2022

(30) Foreign Application Priority Data

Sep. 4, 2020 (KR) .................. 10-2020-0113081

(51) Int. Cl.
*H02K 1/27* (2022.01)
*H02K 1/2793* (2022.01)
*H02K 21/24* (2006.01)

(52) U.S. Cl.
CPC ........... *H02K 1/2793* (2013.01); *H02K 21/24* (2013.01)

(58) Field of Classification Search
CPC ...... G01C 19/72; G01C 19/64; H02K 1/2793; H02K 1/2798; H02K 21/24
USPC ...................................................... 310/156
See application file for complete search history.

(56) References Cited

U.S. PATENT DOCUMENTS

| 8,569,922 B2 * | 10/2013 | Rombach | ............... H02K 1/276 310/49.01 |
| 2014/0042861 A1 * | 2/2014 | Kawaji | ................... H02K 1/276 310/156.53 |

FOREIGN PATENT DOCUMENTS

| DE | 102010030326 A1 * | 12/2011 | ............. H02K 1/276 |
| EP | EP-0751605 A2 * | 1/1997 | ........... H02K 1/2786 |
| JP | 2007-043864 A | 2/2007 | |
| KR | 10-2016-0091919 A | 8/2016 | |
| KR | 10-2017-0066868 | 6/2017 | |
| WO | WO-2010007385 A2 * | 1/2010 | ............... H02K 1/20 |
| WO | WO-2019072538 A1 * | 4/2019 | ............... H02K 1/27 |

* cited by examiner

*Primary Examiner* — Naishadh N Desai
(74) *Attorney, Agent, or Firm* — Lempia Summerfield Katz LLC

(57) ABSTRACT

A rotor of an axial flux motor reduces a cogging torque and torque ripple, and is disposed facing a stator. The rotor includes: a rotation shaft; a rotor core having the rotation shaft connected thereto by passing through a center the rotor core; a plurality of seating grooves concavely formed on one surface of the rotor core facing the stator while being spaced apart from each other at equal intervals along a circumferential direction of the rotor core; and a plurality of protrusions formed on inner wall surface of each of the plurality of seating grooves such that the plurality protrusions face a center of each of the plurality of seating grooves; and a plurality of magnets pressed into and coupled to an associated one of the plurality of seating grooves while plastically deforming the plurality of protrusions of the rotor core.

5 Claims, 10 Drawing Sheets

ROTOR OF AXIAL FLUX MOTOR

CROSS REFERENCE TO RELATED APPLICATION

The present application claims priority to and the benefit of Korean Patent Application No. 10-2020-0113081, filed on Sep. 4, 2020, the entire contents of which are incorporated herein by reference.

FIELD

The present disclosure relates to a rotor of an axial flux motor.

BACKGROUND

The statements in this section merely provide background information related to the present disclosure and may not constitute prior art.

In general, a motor is a power machine that rotates a rotation shaft by an electrical interaction between a rotor and a stator.

Motors are classified into a radial flux motor and an axial flux motor according to a direction of magnetic flux.

In the radial flux motor, a rotor is located inside a stator, and the rotor and the stator are arranged facing each other with a gap therebetween along a radial direction orthogonal to an axis.

On the other hand, in the axial flux motor, a stator and a core of a rotor are arranged to be spaced apart from each other so that a predetermined gap is formed along the axial direction. Thus, the shaft of the motor is rotated by using attractive force and repulsive force generated between magnetic flux generated in the stator and magnetic flux of the magnet attached to the rotor.

On the other hand, in the axial flux motor, when a distance between the facing surface of the stator and the facing surface of the magnet increases, the distance of the gap out of a path that the magnetic flux flows through increases, thereby greatly reducing an output of the motor. In addition, the facing surface of the stator and an individual magnet is distanced apart by the gap having a deviation. When the gap distance deviations between the facing surface of the stator and the magnets are large, cogging torque and torque ripple increase.

Meanwhile, there is an ideal magnetic flux path between the stator and the rotor; however, when the magnetic flux generated by the magnet leaks to the rotor core (a part where the magnets are attached), the path of the magnetic flux deviates from the ideal magnetic flux path. As a result, a total amount of magnetic flux of the magnets may not be fully utilized for the motor rotation. Accordingly, the output of the motor is reduced.

On the other hand, when manufacturing the rotor, to couple a plurality of magnets to the core, an adhesive is used, or a separate support member or a front cover is used.

Alternatively, in a state of both the core and the magnet being placed in the mold, the magnet is bonded to the core by insertion injection of a polymer material.

However, we have discovered that in the case of using the adhesive, the magnet is often separated from the core due to external vibration and heat.

In addition, we have found that in the case of using the separate support member or the insertion injection, a separate part should be manufactured or an additional process is required.

In addition, as a material of the support member that couples the magnet to the core, a non-magnetic plastic material may be used in an effort to prevent leakage of magnetic flux, or stainless steel that is an expensive non-magnetic iron-based material may be used when high strength is required.

The foregoing is intended merely to aid in the understanding of the background of the present disclosure, and is not intended to mean that the present disclosure falls within the purview of the related art that is already known to those skilled in the art.

SUMMARY

The present disclosure provides a rotor of an axial flux motor, the rotor being configured to reduce cogging torque and torque ripple while coupling a magnet to the rotor core without a separate support member.

In one form of the present disclosure, a rotor of an axial flux motor is disposed facing a stator of the axial flux motor. In particular, the motor includes: a rotation shaft; a rotor core having the rotation shaft connected thereto by passing through a center thereof, a plurality of seating grooves concavely famed on one surface of the rotor core facing the stator while being spaced apart from each other at equal intervals along a circumferential direction of the rotor core, and a plurality of protrusions formed on inner wall surfaces of each of the seating grooves such that the protrusions face a center of each of the seating grooves; and a magnet pressed into and coupled to an associated one of the seating grooves while plastically deforming the protrusions of the rotor core.

Each of the seating grooves may be formed in a shape corresponding to a sectional shape of an associated one of a plurality of magnets, each of the inner wall surfaces of each of the seating grooves and an associated one of outer surfaces of each of the magnets may be configured to be spaced apart from each other by a predetermined interval, and the interval between each of the inner wall surfaces of each of the seating grooves and the associated one of the outer surfaces of each of the magnets may be narrower than a length of each of the protrusions before plastic defamation of each of the protrusions.

A sectional shape of each of the seating grooves may be configured as a polygonal shape, and one protrusion may be formed on each of the inner wall surfaces of each of the seating grooves.

Each of the protrusions may be configured to have a shape in which a sectional area thereof gradually decreases toward the center from an associated one of the inner wall surfaces of each of the seating grooves.

Each of the protrusions may be configured to have a notch at a predetermined point, thereby inducing plastic deformation thereof to occur in a region where the notch is formed when one of the magnets is pressed into the associated one of the seating grooves.

Each of the protrusions may be configured to have a plurality of notches on a surface facing a bottom of an associated one of the seating grooves, so as to be bent toward the bottom of same when one of the magnets is pressed into the associated one of the seating grooves.

According to one form of the present disclosure, a plurality of seating grooves in each of which an associated magnet is to be seated is formed in a rotor core, and the protrusions is formed on inner wall surfaces of each of the seating grooves. Thus, the magnet can be coupled to the rotor core without a separate support member by inducing plastic deformation of the protrusions when pressed into the associated one of the seating grooves.

In addition, it is possible to prevent magnetic flux from being leaked by allowing the inner wall surfaces of each of the seating grooves and respective outer surfaces of each of the magnets to be spaced apart from each other by a predetermined distance.

In particular, some magnetic flux can leak through the protrusions that come into contact with the outer surfaces of each of the magnets, but the magnetization characteristics of the protrusions can be deteriorated by plastically deforming the protrusions when the magnet is pressed into the associated one of the seating grooves. Accordingly, the amount of magnetic flux leakage through the protrusions can be reduced.

In addition, when the magnet is pressed into an associated one of the seating grooves of the rotor core, a plurality of magnets can be coupled to the respective seating grooves not individually but simultaneously, so the degree to which the magnets are pressed by the protrusions can be constant. Accordingly, it is possible to reduce the gap deviation between the magnets and the facing surface of the stator, thereby reducing cogging torque and torque ripple.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
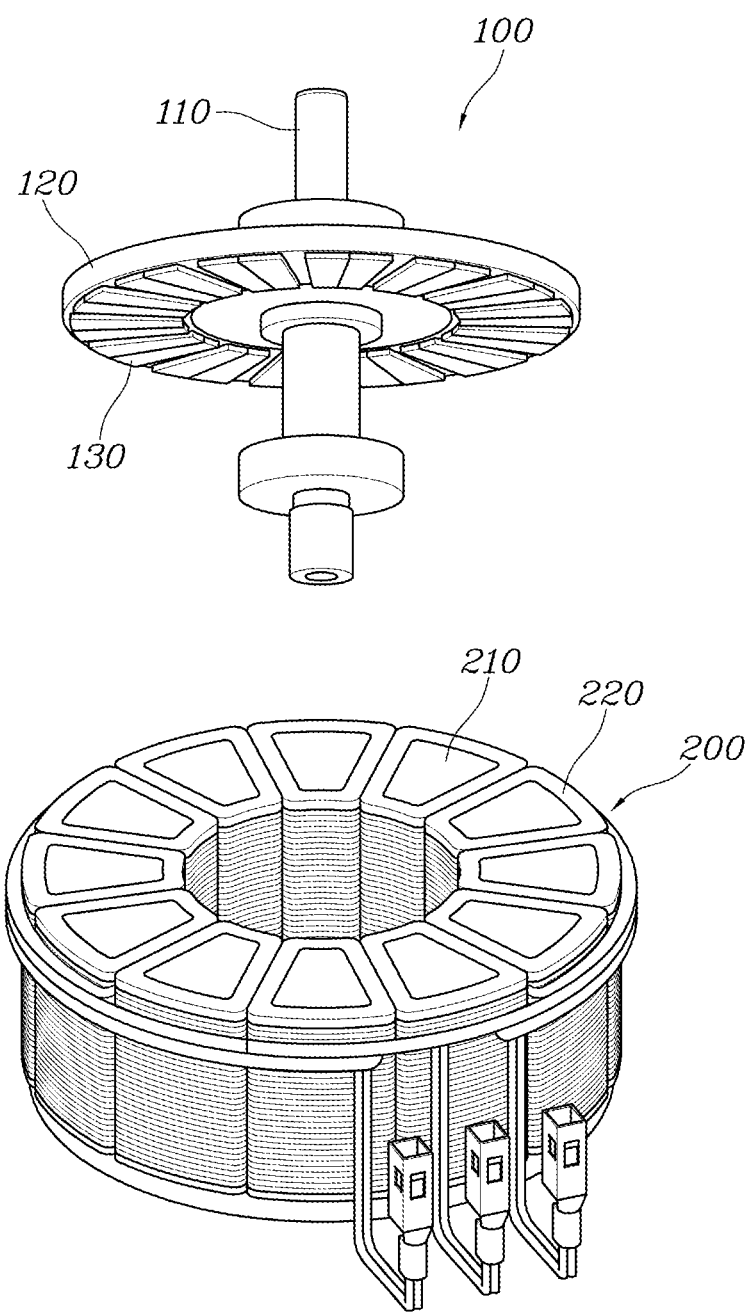
FIG. 1 is a perspective view showing a general axial flux motor.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Hereinafter, various forms of the present disclosure will be described in more detail with reference to the accompanying drawings.

First, a general axial flux motor to which a rotor of an axial flux motor according to one form of the present disclosure is applied will be described.

Figure 2:
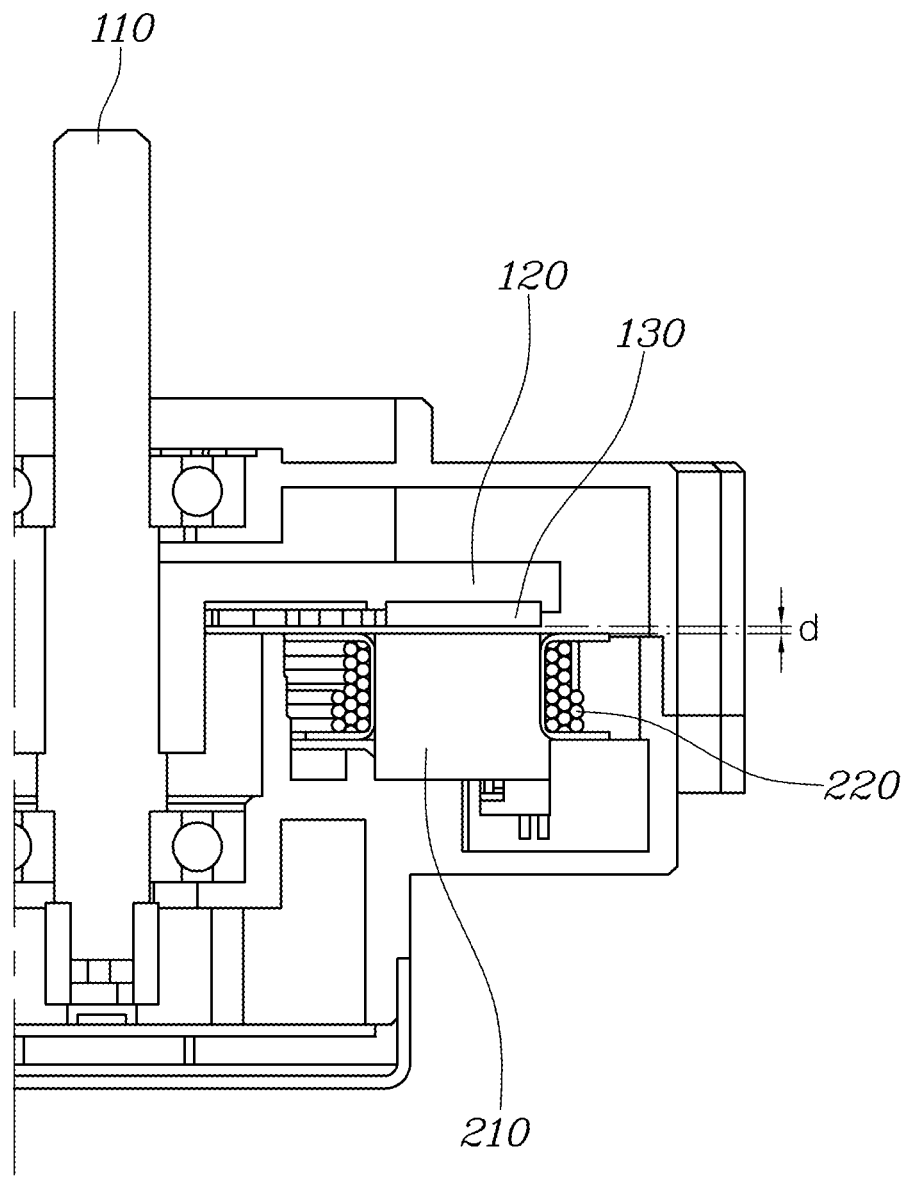
FIG. 2 is a sectional view showing the general axial flux motor.

FIG. 1 is a perspective view showing the general axial flux motor, and FIG. 2 is a sectional view showing the general axial flux motor.

As shown in FIGS. 1 and 2, the axial flux motor includes a rotor 100 and a stator 200.

The rotor 100 includes a rotation shaft 110, a disk-shaped rotor core 120 having the rotation shaft connected thereto by passing through a center thereof, and a plurality of magnets 130 coupled to a surface of the rotor core 120.

The stator 200 includes a columnar stator core 210 disposed by being spaced apart along a circumferential direction and a coil 220 wound around the stator core 210.

At this time, the stator 200 and the rotor 100 are spaced apart from each other such that a predetermined gap d is to be formed along an axial direction between a surface of the stator core 210 of the stator 200 and a surface of the magnet 130 coupled to the rotor core 120.

Accordingly, when power is applied to the coil 220 of the stator 200, the rotation shaft 110 is rotated by the attractive force and repulsive force generated between magnetic flux generated in the coil and magnetic flux of the magnet 130 coupled to the rotor 100.

On the other hand, the present disclosure provides an improved coupling structure of a rotor core and magnets constituting a rotor. A structure of the rotor core and a resulting coupling structure with the magnet will be described with reference to the drawings.

Figure 3:
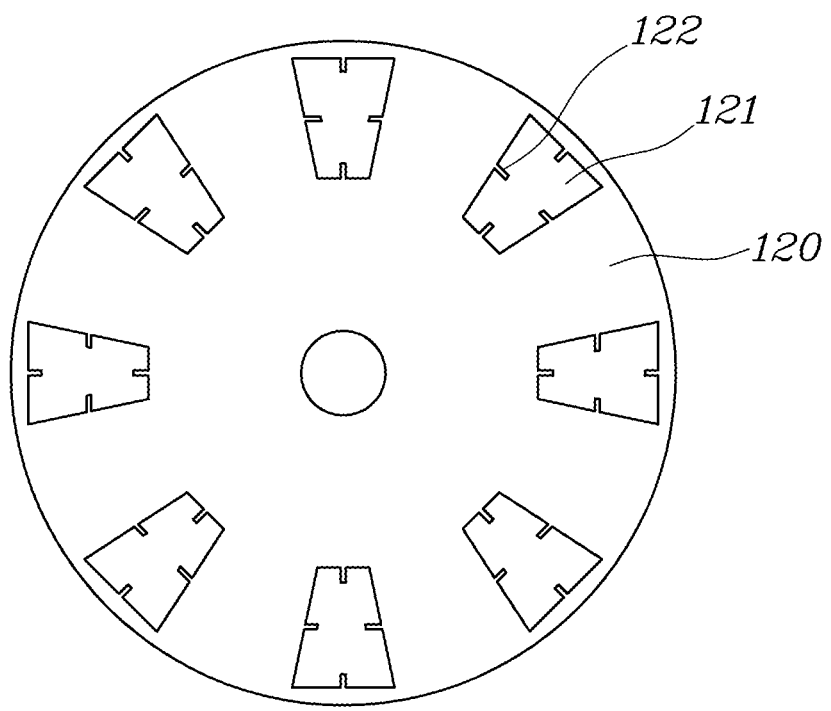
FIG. 3 is a plan view showing a rotor core constituting a rotor of an axial flux motor according to one foam of the present disclosure.
Figure 4:
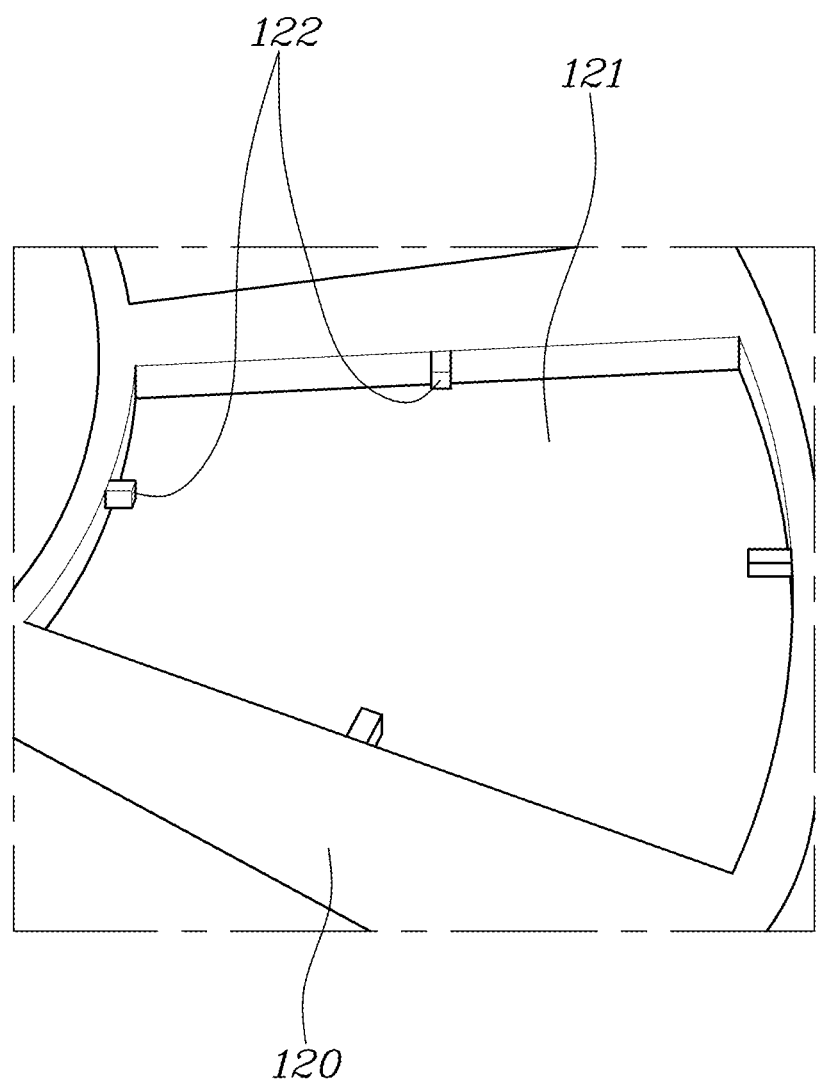
FIG. 4 is a perspective view showing main parts of the rotor core constituting the rotor of the axial flux motor according to one form of the present disclosure.
Figure 5:
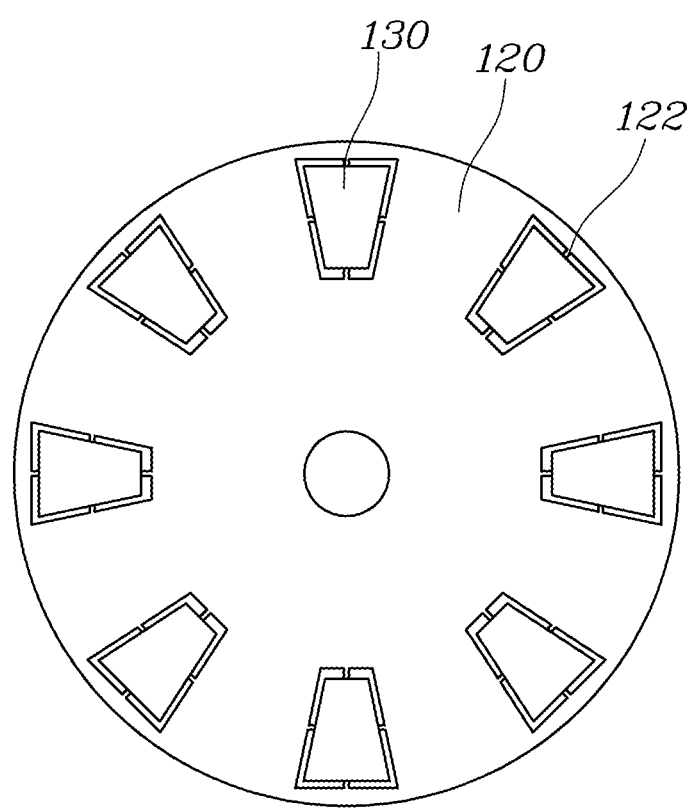
FIG. 5 is a plan view showing the rotor core and a magnet constituting the rotor of the axial flux motor according to one form of the present disclosure.

FIG. 3 is a plan view showing a rotor core constituting a rotor of an axial flux motor according to one foam of the present disclosure, FIG. 4 is a perspective view showing main parts of the rotor core constituting the rotor of the axial flux motor according to one form of the present disclosure, and FIG. 5 is a plan view showing the rotor core and a magnet constituting the rotor of the axial flux motor according to one form of the present disclosure.

As shown in the drawings, like the rotor of the general axial flux motor, the rotor 100 of the axial flux motor according to one form of the present disclosure has a rotation shaft 110, a disk-shaped rotor core 120 to which the rotation shaft 110 is connected by passing through a center thereof, and a plurality of magnets 130 coupled to a surface of the rotor core 120.

However, a plurality of seating grooves 121 in each of which a magnet is to be seated by being pressed thereinto is formed in the rotor core 120. At this time, each of the seating grooves 121 prevents the associated magnet from deviating in a radial direction.

To delineate, the seating grooves 121 is concavely formed on one surface, facing the stator 200, of opposite surfaces of the rotor core while being spaced apart from each other at equal intervals along a circumferential direction of the rotor core 120.

In addition, a plurality of protrusions 122 is protrudingly formed on inner wall surfaces of each of the seating grooves 121 such that the protrusions face a center of each of the seating grooves.

Accordingly, the magnet 130 plastically deforms the protrusions 122 of the rotor core 120 while being pressed into an associated one of the seating grooves 121, and then is coupled to the associated one of the seating grooves in a state of being pressed by the plastically deformed protrusions 122.

Each of the seating grooves 121 is formed in a shape corresponding to a sectional shape of an associated one of the magnets 130. However, a size of each of the seating grooves 121 is formed to be slightly larger than that of an associated one of the magnets 130 in order to allow each of the inner wall surfaces of each of the seating grooves and an associated one of outer surfaces of each of the magnets 130 are configured to be spaced apart from each other by a predetermined interval.

At this time, the interval between each of the inner wall surfaces of each of the seating grooves 121 and the associated one of the outer surfaces of each of the magnets 130 may be narrower than a length of each of the protrusions 122 before plastic deformation of each of the protrusions. Thus, when the magnet 130 is pressed into the associated one of the seating grooves 121, the protrusions 122 may be allowed to be plastically deformed by the associated one of the magnets 130.

Thus, with the magnet 130 and the inner wall surfaces of the associated one of the seating grooves 121 being in a state of being spaced apart from each other by the predetermined interval, the magnet 130 is held in a fixed state by the protrusions 122. As such, the magnetic flux leakage of each of the magnets 130 is prevented by spacing the magnet 130 and the inner wall surfaces of the associated one of the seating grooves 121 apart from each other.

On the other hand, the protrusions 122 serve to couple each of the magnets to associated one of the seating grooves 121, but the magnetic flux generated from each of the magnets 130 may leak through the associated protrusions 122. Accordingly, the number and area of contact between each of the magnets 130 and the associated protrusions 122 may be minimized.

For example, as shown in FIG. 3, a sectional shape of each of the seating grooves 121 may be formed in a polygonal shape, such as a tetragon, and only one protrusion 122 may be formed on each of the inner wall surfaces of each of the seating grooves 121.

In addition, each of the protrusions 122 may be configured to have various shapes that are suitable for plastic deformation of the protrusions 122 by being easily bent by the associated one of the magnets 130 when the magnet 130 is pressed into the associated one of the seating grooves 121.

FIGS. 6A, 6B, 6C and 6D show various forms of the protrusions formed in the rotor core constituting the rotor of the axial flux motor according to some forms of the present disclosure.

In FIGS. 6A-6D, a −z-axis direction is a direction of each of the inner wall surfaces of each of the seating grooves 121, a z-axis direction is a direction toward a center of each of the seating grooves 121, and the y-axis direction is a direction toward a bottom of each of the seating grooves 121. Therefore, when the magnet 130 is pressed into the associated one of the seating grooves 121, the magnet is pressed to the y-axis direction from a −y-axis direction.

Figures 6A, 6B, 6C, 6D:
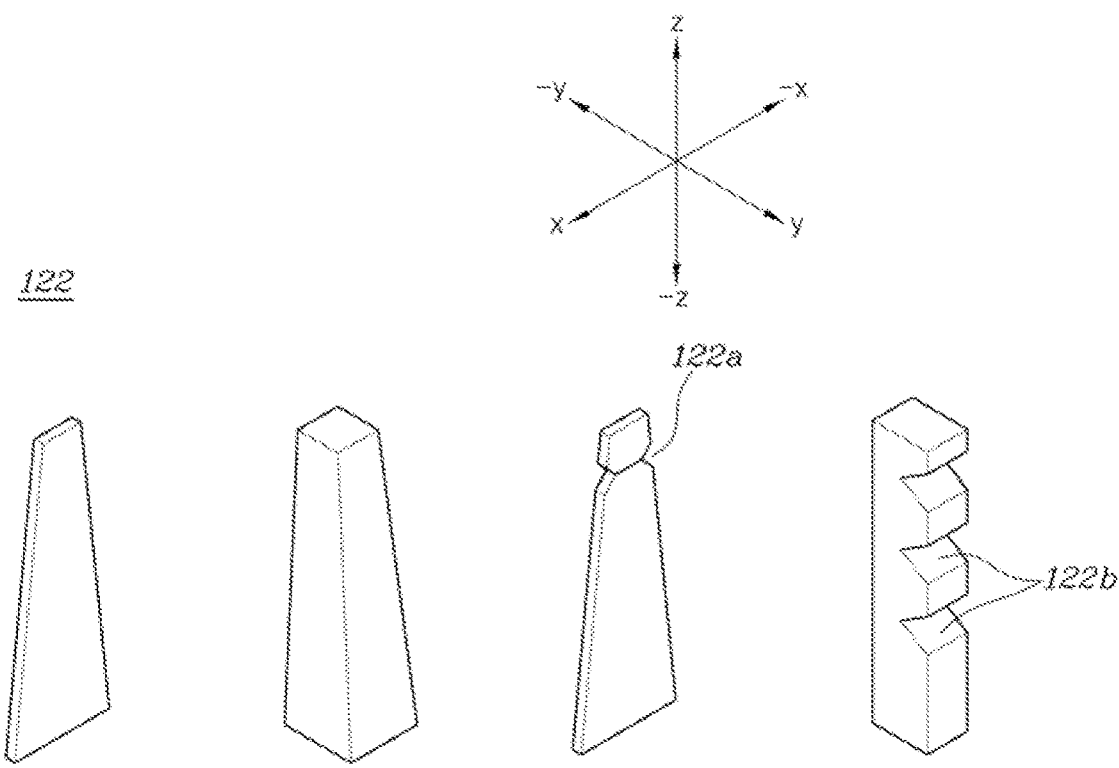
FIGS. 6A, 6B, 6C and 6D show various forms of protrusions formed in the rotor core constituting the rotor of the axial flux motor according to the present disclosure.

As shown in FIGS. 6A and 6B, each of the protrusions 122 may be configured to have a shape in which a sectional area thereof gradually decreases toward the center from the inner wall surface of each of the seating grooves 121.

At this time, each of the protrusions 122, such as one shown in FIG. 6A, is configured to have a shape in which the width in the x-axis direction gradually decreases as going toward the z-axis direction, without change of the thickness in the y-axis.

In addition, each of the protrusions 122, such as one shown in FIG. 6B, is configured to have a shape wherein both the thickness in the y-axis direction and the width in the x-axis direction gradually decrease as going toward the z-axis direction.

On the other hand, each of the protrusions 122, such as one shown in FIG. 6C, is configured to have a notch 122a at a predetermined point in the x-axis and −x-axis directions. Therefore, when the magnet 130 is pressed into the associated one of the seating grooves 121, bending is easily generated in the region where the sectional area is reduced due to the notch 122a formed thereat, thereby inducing the plastic deformation to occur.

In addition, each of the protrusions 122, such as one shown in FIG. 6D, is configured to have a plurality of notches 122b on a surface in the direction toward the bottom (y-axis direction) of each of the seating grooves 121. Therefore, when the magnet 130 is pressed into the associated one of the seating grooves 121, the protrusions 122 are induced to be bent toward the bottom of the associated one of the seating grooves 121.

Next, a process of coupling the magnet to the rotor core will be described with reference to the drawings.

Figure 7A:
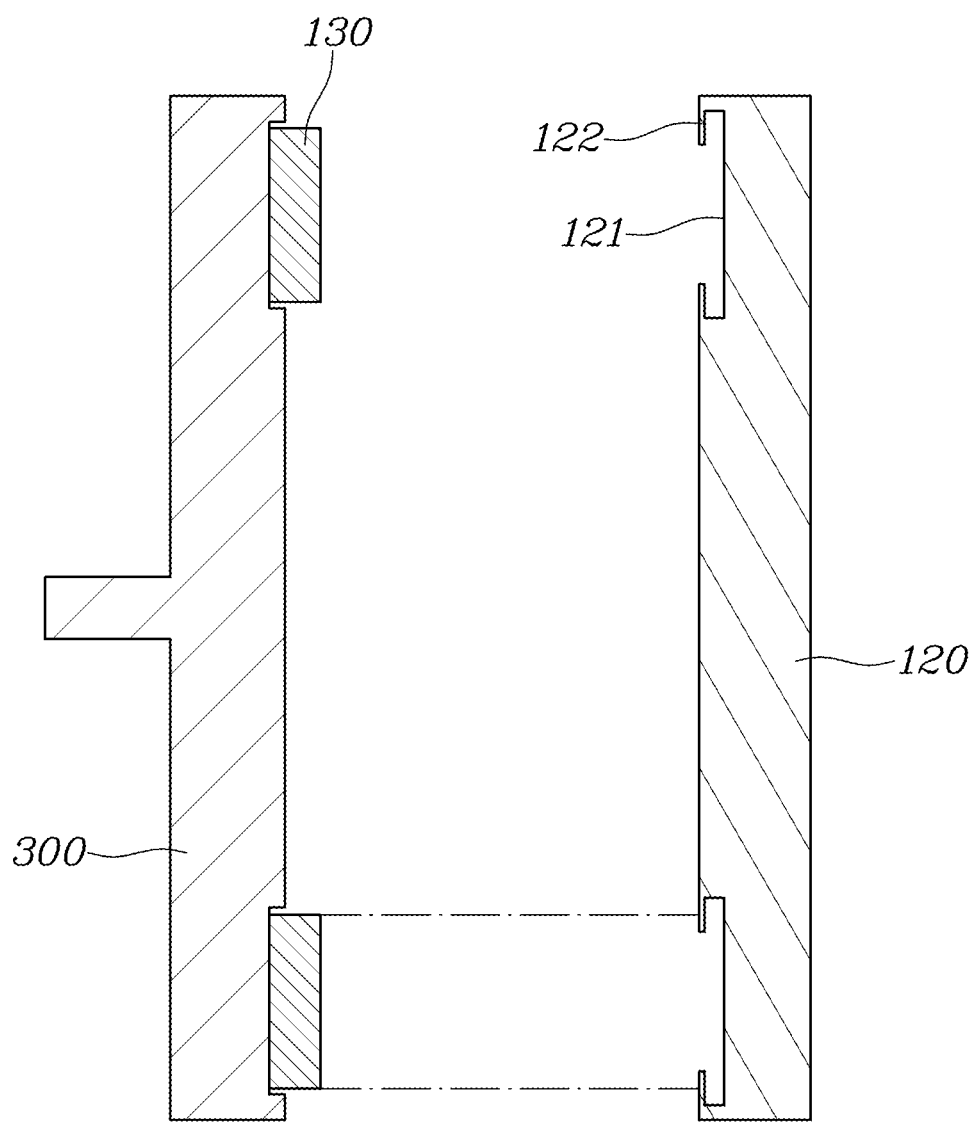
FIGS. 7A to 7C are views showing steps of manufacturing the rotor of the axial flux motor according to one form of the present disclosure.
Figure 7B:
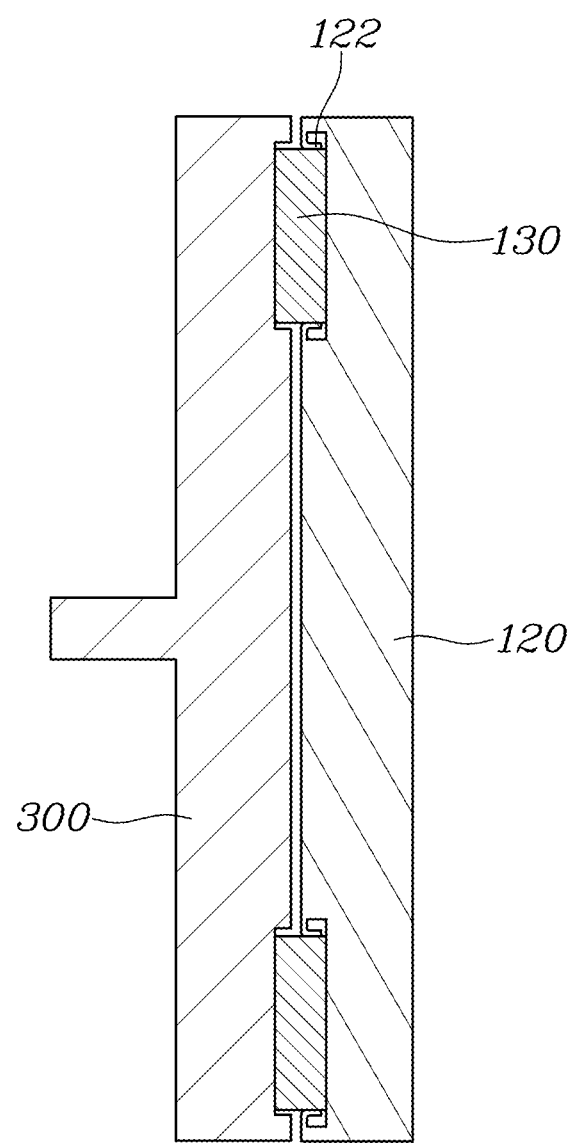
Figure 7C:
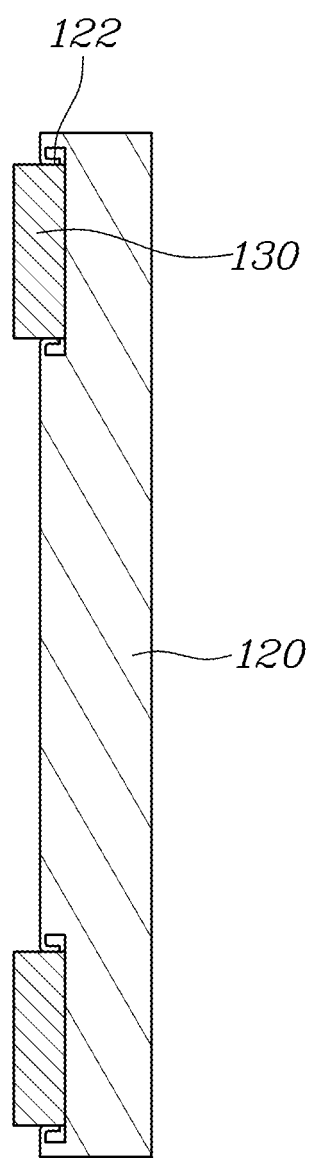

FIGS. 7A to 7C are views showing steps of manufacturing the rotor of the axial flux motor according to one form of the present disclosure.

First, a rotor core 120 in which a plurality of seating grooves 121 and a plurality of protrusions 122 are formed is prepared.

Then, a jig 300 chucking a plurality of magnets 130 at once to correspond to the arrangement of the seating grooves 121 is prepared.

Thus, as shown in FIG. 7A, the magnets 130 is chucked to the jig 300 and disposed to be faced the rotor core 120.

Then, as shown in FIG. 7B, the jig 300 is advanced in a direction of the rotor core 120, thereby leading each of the magnets 130 to be pressed into the associated one of the seating grooves 121 of the rotor core 120. At this time, each of the magnets 130 bends the associated protrusions 122 while being pressed into the associated one of the seating grooves 121 and lets the associated protrusions 122 to be plastically deformed.

When each of the magnets 130 is pressed into and fixed to the associated one of the seating grooves 121, the magnets 130 is separated from the jig 300, as shown in FIG. 7C.

In this way, each of the magnets 130 is simultaneously pressed into the associated one of the seating grooves 121 with the same pressure, and then a state, where each of the magnets 130 is pressed into the associated one of the seating grooves 121 to the same depth by the associated protrusions 122, is kept. Accordingly, it is possible to reduce the deviation of the gap between each surface of the magnets 130 and an associated surface of the stator 200 facing each other. Accordingly, cogging torque and torque ripple are reduced.

Figure 8:
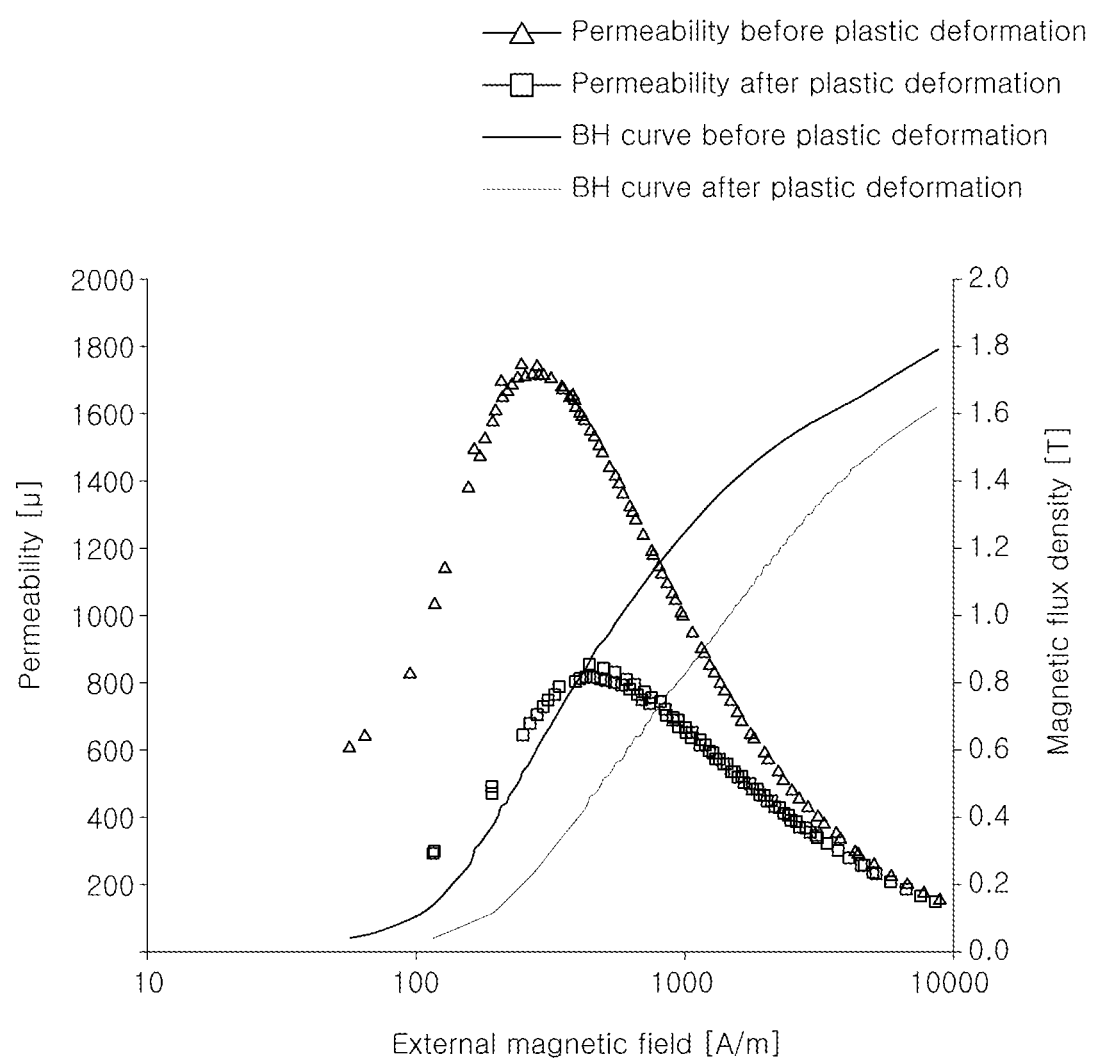
FIG. 8 shows graphs illustrating magnetic characteristics before and after plastic deformation of the protrusions formed in the rotor core constituting the rotor of the axial flux motor according to one form of the present disclosure.

FIG. 8 shows graphs illustrating magnetic characteristics before and after plastic deformation of the protrusions formed in the rotor core constituting the rotor of the axial flux motor according to one form of the present disclosure.

As shown in FIG. 8, it was possible to confirm that the permeability and magnetic flux density of the protrusions 122 were lower after the plastic deformation of the protrusions 122 than before the plastic deformation of the protrusions 122. Accordingly, it was possible to confirm that the magnetic flux leaked through the protrusions 122 may be reduced by inducing plastic deformation of the protrusions 122 when each of the magnets 130 is pressed into the associated one of the seating grooves 121.

On the other hand, when the magnets is individually fixed to the rotor core, a deviation occurs in the gap d between each of the magnets and the stator core, and this deviation becomes a cause to increase in cogging torque generated when the motor rotates.

In one form, the magnets 130 are chucked to the jig 300, and by using this, each of the magnets 130 is pressed into and fixed to an associated one of the seating grooves in a single operation to the rotor core 120 in which the seating grooves 121 each having the protrusions 122 are famed. Thus, it is possible to reduce the deviation of the gap d between each of the magnets 130 and an associated surface of the stator core 210.

In order to check out such results, both a rotor of a comparative example, in which a plurality of magnets is individually fixed, and a rotor of an axial flux motor according to one form of the present disclosure are respectively used to measure the cogging torque, and the results are shown in Table 1 below.

| Classification | Comparative example | Embodiment |
|---|---|---|
| Total torque (mNm@30RPM) | 171 | 88 |
| Cogging torque generated by rotor coupled to magnet (mNm@30RPM) | 81 | 26 |

At this time, the cogging torque is expressed by being classified into the total cogging torque generated by the motor and the cogging torque generated by the rotor to which the magnets is coupled.

The total cogging torque is a measured value of the cogging torque generated when the motor rotates, and the cogging torque generated by the rotor to which the magnets is coupled is a value represented by being separated by order analysis among the signals for the total cogging torque.

Here, the order analysis refers to a method that differentiates and analyzes a waveform generated by a magnet among signals that are waveforms for cogging torque.

In addition, the cogging torque generated by the rotor to which the magnets is coupled may be inferred to be generated due to the deviation of the gap d between the stator core and the magnets coupled to the rotor core.

As shown in Table 1, it was possible to confirm that the total cogging torque was reduced in one form by 83 mNm@30 RPM compared to the comparative example, thereby being decreased to 51% thereof.

In particular, separately looking at the cogging torque (mNm@30 RPM) generated by the rotor to which the magnets was coupled among the total cogging torque, the cogging torque generated by the rotor to which the magnets was coupled was reduced in the embodiment by 55 mNm@30 RPM compared to the comparative example.

From the above results, the ratio of the reduction value of the cogging torque generated by the rotor to which the magnets was coupled to the reduction value of the total cogging torque was about 66%. Accordingly, it was confirmed that the cogging torque may be significantly reduced by reducing the deviation of the gap d between the magnet coupled to the rotor core and the stator core.

Although the present disclosure has been described with reference to the accompanying drawings and the above-described exemplary forms, the present disclosure is not limited thereto. Therefore, those of ordinary skill in the art may variously modify and change the exemplary forms within the scope of the technical spirit of the present disclosure.

What is claimed is:

1. A rotor of an axial flux motor, the rotor being disposed facing a stator, the rotor comprising:
    a rotor core facing the stator;
    a rotation shaft connected to the rotor core and configured to pass through a center of the rotor core;
    a plurality of seating grooves concavely formed on a surface of the rotor core while being spaced apart from each other at equal intervals along a circumferential direction of the rotor core; and
    a plurality of protrusions formed on an inner wall surface of each seating groove of the plurality of seating grooves,
    wherein:
        protrusions of the plurality of protrusions face a center of the seating groove of the plurality of seating grooves that corresponds to a location of a magnet;
        the magnet of a plurality of magnets is pressed into and coupled to an associated one of the plurality of seating grooves while plastically deforming the plurality of protrusions of the rotor core; and
        each protrusion of the plurality of protrusions has a plurality of notches on a surface facing a bottom of the associated one of the plurality of seating grooves, such that each protrusion of the plurality of protrusions is bent toward the bottom of the associated one of the plurality of seating grooves when one of the plurality of magnets is pressed into the associated one of the plurality of seating grooves.

2. The rotor of claim 1, wherein each seating groove of the plurality of seating grooves is formed in a shape corresponding to a sectional shape of the magnet of the plurality of magnets,
    wherein the inner wall surface of each seating groove of the plurality of seating grooves and an outer surface of the magnet of the plurality of magnets are spaced apart from each other by a predetermined interval, and
    wherein the predetermined interval between each inner wall surface of each seating groove of the plurality of seating grooves and the associated one of the outer surfaces of each magnet of the plurality of magnets is narrower than a length of each protrusion of the plurality of protrusions before plastic deformation of each protrusion of the plurality of protrusions.

3. The rotor of claim 1, wherein a sectional shape of each seating groove of the seating grooves is a polygonal shape, and
    one protrusion is formed on each inner wall surface of each seating groove of the plurality of seating grooves.

4. The rotor of claim 1, wherein each protrusion of the plurality of protrusions has a sectional shape in which a sectional area thereof gradually decreases toward the center of the seating groove from an associated one of the inner wall surface of each seating groove of the plurality of seating grooves.

5. The rotor of claim 1, wherein each protrusion of the plurality of protrusions has the plurality of notches notch at predetermined points, thereby inducing plastic deformation in regions where the plurality of notches are formed when the one of the plurality of magnets is pressed into the associated one of the plurality of seating grooves.

* * * * *